United States Patent [19]
De Haan et al.

[11] Patent Number: 5,328,617
[45] Date of Patent: Jul. 12, 1994

[54] AIR-ASSIST DISCHARGE OF FILTER PRESS CAKE

[75] Inventors: Joel D. De Haan; Daniel De Haan; Gregory De Haan, all of Zeeland; David J. Spyker, Holland; David P. Mc Leod, Muskegon; Wesley G. Koops, Holland, all of Mich.

[73] Assignee: JWI, Inc., Holland, Mich.

[21] Appl. No.: 952,236

[22] Filed: Sep. 28, 1992

[51] Int. Cl.5 .............................................. B01D 25/32
[52] U.S. Cl. ................................... 210/768; 210/791; 210/225; 210/230; 210/231; 100/198; 100/199; 134/76
[58] Field of Search ............... 210/225, 230, 231, 106, 210/768, 791; 10/198, 199; 134/76

[56] References Cited

U.S. PATENT DOCUMENTS

| | | | |
|---|---|---|---|
| 3,620,233 | 11/1971 | Busse et al. | 134/57 R |
| 3,637,082 | 1/1972 | Bentzien | 210/225 |
| 4,076,033 | 2/1978 | Busse et al. | 134/172 |
| 4,082,663 | 4/1978 | Sato . | |
| 4,107,042 | 8/1978 | Heinrich et al. | 210/225 |
| 4,172,792 | 10/1979 | Heinrich et al. | 210/230 |
| 4,209,404 | 6/1980 | Yoshida | 210/225 |
| 4,289,618 | 9/1981 | Schotten et al. | 210/142 |
| 4,397,744 | 8/1983 | Haruo | 210/225 |
| 4,405,457 | 9/1983 | Busse et al. | 210/225 |
| 4,446,020 | 5/1984 | Kurita | 210/225 |
| 4,448,221 | 5/1984 | Murray | 134/76 |
| 4,659,465 | 4/1987 | Makinoda | 210/225 |
| 4,806,239 | 2/1989 | Davis | 210/225 |
| 5,167,801 | 12/1992 | Kawasaki | 210/225 |

Primary Examiner—Robert A. Dawson
Assistant Examiner—David Reifsnyder
Attorney, Agent, or Firm—Flynn, Thiel, Boutell & Tanis

[57] ABSTRACT

A filter press plate shifter assembly provided with a shifting housing having a tunnel-like center part which passes over the filter plates and housing parts positioned adjacent opposite side rails. The housing parts are rollingly supported on rods which extend along the side rails. One housing part mounts a rotary pneumatic motor and a drive roller which drivingly engages the rod to control movement of the shifter assembly along the press. Each side housing part mounts a pneumatic plate shifter for permitting the endmost plate in the closed stack to be individually and sequentially shifted away from the stack into an open position when discharge of filtrate is desired. The shifter housing mounts a bumping device which cooperates with the endmost plate in the stack to effect vertical bumping thereof relative to the support rails to assist in loosening sticky cake which adheres to the plate. The shifter housing also mounts an air-assist discharge mechanism which includes a nozzle-bearing head assembly which moves vertically downwardly between the opposed faces of an open pair of adjacent plates for discharging pressurized airstreams downwardly against the plates to assist in removing the sticky cake from the plates. The overall operation of the shifter assembly is fully automated to permit each adjacent pair of plates in the closed stack to be opened, bumped and subjected to an air blow to cause discharge of sticky cake.

18 Claims, 10 Drawing Sheets

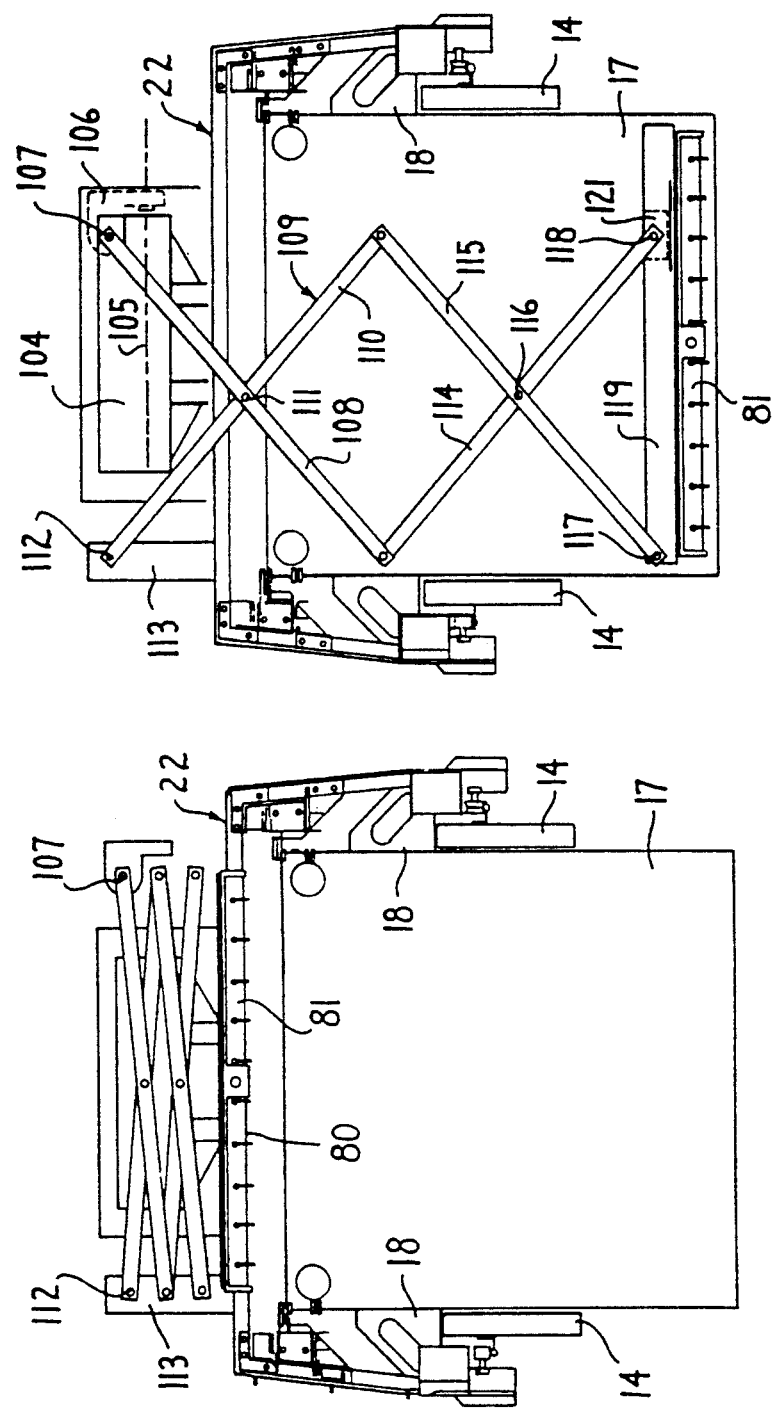

AIR-ASSIST DISCHARGE OF FILTER PRESS CAKE

FIELD OF THE INVENTION

This invention relates to a filter press and, more particularly, to a plate shifting mechanism for preferably automatically and sequentially shifting individual filter plates into an open position, with the shifting mechanism incorporating vibratory and air blow devices to facilitate removal of liltrate, particularly sticky filtrate, from the open filter plates.

BACKGROUND OF THE INVENTION

Filter presses are well known and extensively utilized for separating solids from slurries. Such presses employ a plurality of filter plates which are held in contacting relationship between fixed and movable head members while the slurry is pumped into and through the press for collecting the solid in the form of filtrate or cake between adjacent filter plates. When the press is full, then the movable head is backed away from the plates into an open position, and in one type of conventional press, the plates are then individually and sequentially moved into an open position adjacent the movable head to permit discharge of the cake which has collected between the adjacent pairs of plates. To permit movement of the plates into an open position, numerous plate shifting mechanisms have been provided for permitting either automatic or manual control over the plate movement and cake discharge.

In the known filter presses, the plate shifter mechanisms often have required various manual controls or manual manipulations associated with the movement of the plate shifter to effect sequential movement of the plates during opening thereof and dumping of the filter cake, although numerous filter press assemblies have incorporated automatic shifting mechanisms to permit such opening and dumping of the plates to be sequentially automated. Most of the automated shifter assemblies, however, have required drive mechanisms such as chains or pressure cylinders positioned adjacent opposite sides of the press, which drive mechanisms themselves are generally elongate throughout substantially the entire length of the press and hence not only increase the overall size and mechanical complexity of the press, but additionally significantly increase the overall cost of the press. These drive mechanisms are also typically disposed in areas where they are subject to contamination by the material being handled. The filter presses employing automated plate shifters have thus possessed structural and functional features which have been less than desirable.

In addition, the known filter presses have also often operated in less than a satisfactory manner when utilized with materials which result in a filtrate or cake having "sticky" properties. That is, when dealing with "sticky" cake, relying solely on gravity to cause discharge of the cake from between the opened filter plates is often insufficient to effect proper discharge since the cake tends to stick to the filter cloths or membranes of the filter plates. It has been conventional practice to manually assist the discharge by having an operator scrape the sticky cake from the filter plates by use of a paddle or the like. Needless to say, this is a very inefficient and time-consuming process. Further, satisfactory cleaning of the filter plates is difficult to achieve using this technique.

In an effort to improve the discharge of sticky cake, filter presses have been developed and sold which have employed a vibrator, one such press being manufactured and sold by Perrin of Canada. In such press, the filter plates are joined together through a control device such as a cable or linkage so that, during opening of the press, all of the plates are substantially simultaneously moved into an open separated condition with the spacing or separation between each adjacent pair of plates being controlled by the connecting linkage. All of the plates, adjacent one side thereof, are supported on an elongate tube which extends longitudinally along the press and is of square or rectangular profile. This tube is then rotated so as to impose a vibration or bouncing movement on the handles provided adjacent one side of the filter plates, whereby all of the plates are vibrated to assist in discharge of the sticky cake. While such arrangement is at least partially effective for permitting discharge of sticky cake, nevertheless this is still of undesirable structure since it requires an additional vibrating drive shaft extending longitudinally substantially throughout the length of the press, and in addition requires a long support frame or support rail arrangement since all of the filter plates are moved into an open and spaced relationship at the same time.

While it is also known to equipped filter presses with liquid washing devices for permitting cleaning of filter plates, nevertheless such devices are typically used only in a very controlled manner and in selected use situations, and typically are not used at the completion of each filter press cycle. More specifically, these washing devices typically spray water on the opened filter plates so as to permit cleaning and flushing of the filter clothes, and hence such will normally be done only infrequently, namely after a selected number of filter press cycles. Further, when such technique is used, it is typically not used to effect dislodge of the filter cake since such would significantly increase the amount of liquid in the filter cake, and thus partially destroy the purpose of the filter press operation, namely the removal of liquid.

To improve upon filter presses employing a plate shifter assembly for permitting automatic and sequential shifting of filter plates into open positions during discharge of the press, the Assignee hereof has developed an improved press which is disclosed in copending U.S. Ser. No. 07/904 406. In the press of this latter application, the press is provide with an arch-type shifter housing which extends over and projects downwardly on both sides of the plates so that the downwardly projecting legs of the housing, adjacent lower ends thereof, are rollingly supported on the opposite elongate side rails of the press. Each of the side legs of the housing has a structure which mounts thereon a pneumatic plate shifter mechanism, and in addition one of the housing side legs mounts a pneumatic drive motor which cooperates with a stationary elongate rod which extends parallel to the guide rail to effect driving movement of the housing and shifter mechanism longitudinally along the press. The entire operation, including the movement of the housing in a steplike manner along the press, and the individual sequential shifting of the filter plates and the synchronized movement thereof with the steplike movement of the housing, is pneumatically operated, including a pneumatic logic control for controlling all of the pneumatic drive devices. The improved press of this copending application is believed to represent a desirable improvement over prior conventional structures, although the press of this prior application itself does not satisfactorily resolves the problems associated with discharge of sticky cake. However, many of the mechanisms associated with the shifter of the press of this prior application are incorporated into the present invention, and the disclosure of copending U.S. application Ser. No. 07/904 406 is, in its entirety, incorporated herein by reference.

Accordingly, it is an object of this invention to provide an improved filter press which is particularly desirable for use with materials which create a sticky cake or filtrate, which improved filter press greatly facilitates the discharge of sticky cake and overcomes many of the disadvantages associated with prior filter presses.

More specifically, it is an object of this invention to provide an improved filter press which incorporates devices which subject the filter plates to both a vibrating or bumping action to effect loosening of the sticky cake on the filter plates, and which thereafter subject the open filter plates to an air blow cycle to assist in discharging the sticky cake from the filter plates. The vibrating and air blow operations are preferably sequentially carried out after one of an adjacent pair of filter plates has been moved into an open position to assist in effecting downward discharge of the sticky cake from between the opened pair of filter plates, with the next filter plate thereafter being moved into an open position and the overall process being repeated between the next pair of opened plates.

It is a further object of the invention to provide an improved filter press, as aforesaid, having an improved filter plate shifting assembly which is of the arch-type so as to contain a drive associated with only one side of the filter press, without requiring driving elements extending longitudinally along both sides of the press, which arch-type shifter assembly also mounts thereon devices for effecting both vibrating and air blowing of the filter plates as described above.

Other objects and purposes of the invention will be apparent to persons familiar with presses of this general type upon reading the following specification and inspecting the accompanying drawings.

BRIEF DESCRIPTION OF THE DRAWINGS

FIGS. 10A and 10B are views similar to FIG. 9 but illustrating a further variation of the air blow device.

Figure 1:
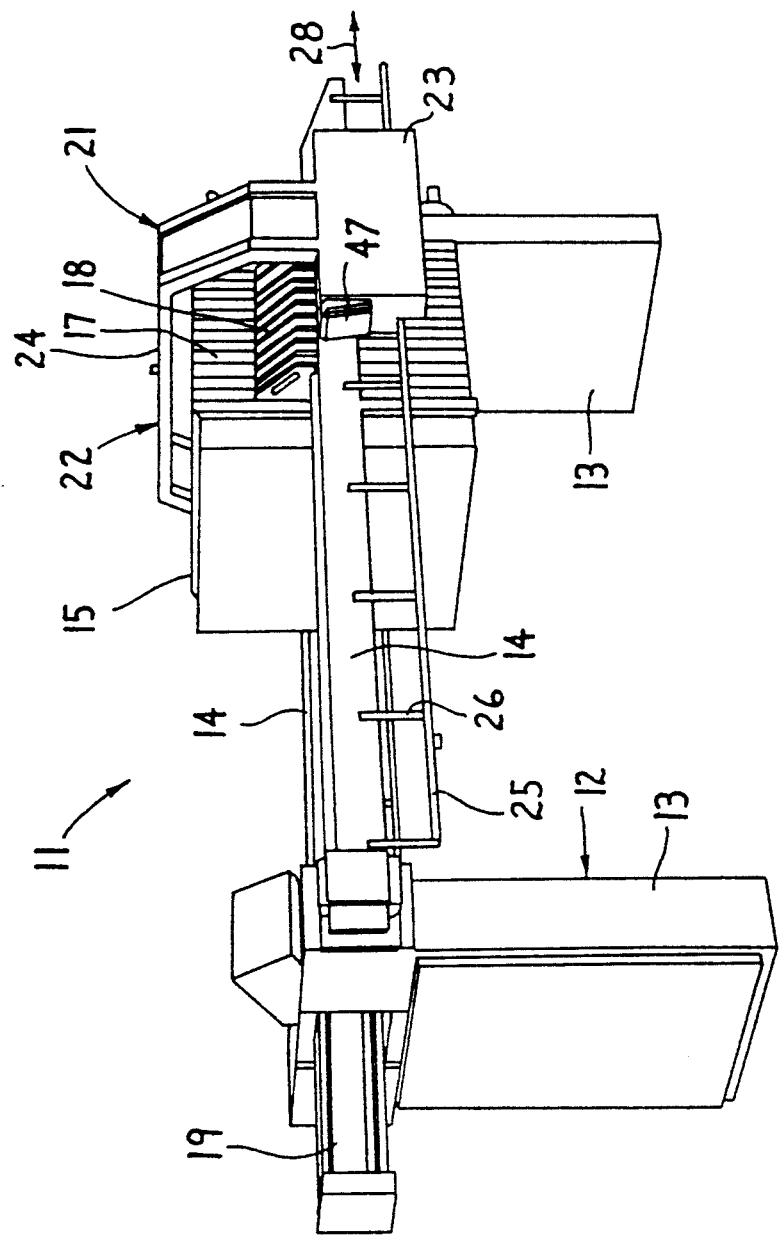
FIG. 1 is a perspective view of a prior art filter press.

Certain terminology will be used in the following description for convenience in reference only, and will not be limiting. For example, the words "upwardly", "downwardly", "rightwardly" and "leftwardly" will refer to directions in the drawings to which reference is made. The word "forward" will refer to a direction of movement toward the fixed end of the press, namely rightwardly in FIGS. 1 and 2, and the word "rearward" will refer to the opposite movement direction. The words "inwardly" and "outwardly" will refer to directions toward and away from, respectively, the geometric center of the press and designated parts thereof. Said terminology will include the words specifically mentioned, derivatives thereof, and words of similar import.

DETAILED DESCRIPTION

Figure 2:
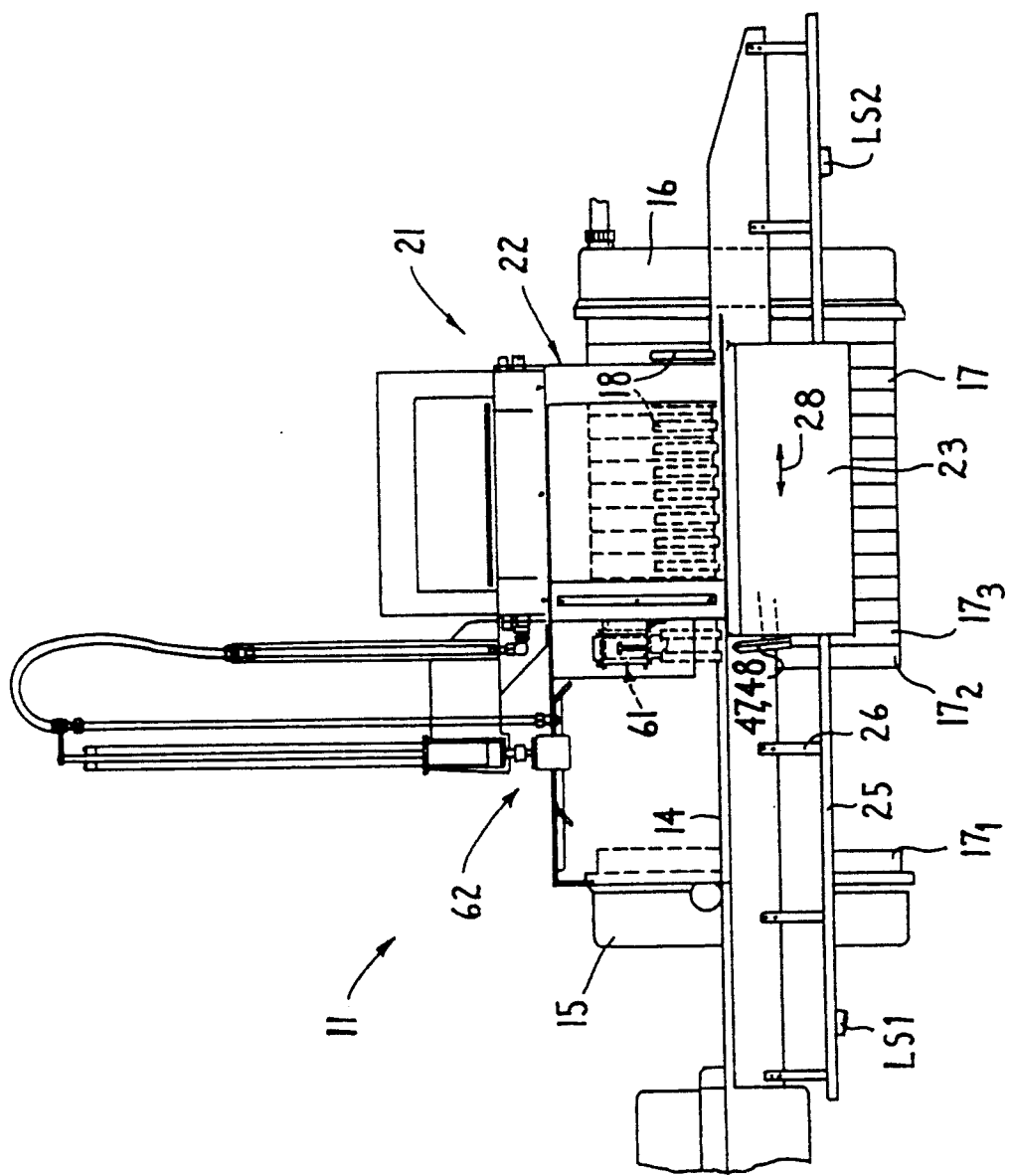
FIG. 2 is a fragmentary side elevational view of the improved filter press of this invention and showing the plate shifter assembly positioned for engagement with and shifting of one of the filter plates in the stack when the press is in an open position.

FIG. 1 illustrates a conventional filter press 11 having a frame 12 which includes a pair of end frames or supports 13 rigidly joined together by a pair of generally parallel and horizontally extending side rails 14 which are sidewardly spaced apart. The press includes a head 15 which is movably supported on the rails 14 for movement toward and away from a further head 16 (FIG. 2) which is fixedly secured adjacent the other end of the frame, with a plurality of conventional filter plates 17 disposed between the heads so as to be held in clamped sealed relationship to one another.

The filter press 11 also includes a plate shifter assembly 21 which includes a generally U-shaped or tunnel-like housing 22 defined by generally hollow housing parts 23 which are disposed adjacent the opposite side rails 14 and rigidly joined together by an arched center part 24 which projects upwardly so as to pass over the filter plates 17 and the movable head 15. This shifter housing 22 is supported for movement horizontally longitudinally along the filter press, and for this purpose is supported on elongate support rods 25 which are fixedly joined by hangers 26 to the respective side rails 14, whereby the support rods 25 are horizontally elongated in parallel relationship to the rails 14 and are spaced sidewardly therefrom by a small distance. Each housing part 23 has a pair of rollers 27 (FIG. 3) provided thereon which are rollingly engaged with the respective rod 25 so that the entire shifter assembly 21 can be moved longitudinally along the press substantially as indicted by arrows 28.

Handles 18 associated with the filter plates 17 are disposed so as to project outwardly from opposite sides of the individual filter plates at an elevation spaced downwardly from the upper edges of the filter plates so as to be slidably supported on the rails 14, whereby the individual filter plates are disposed between and effectively suspended downwardly between the opposed side rails 14. The plates 17 in the filter press are of the type wherein each plate is defined by a generally rectangular outer frame which surrounds a cavity, with a pair of filter cloths or membranes positioned generally so as to extend across the cavity, with the filter cloths being individually carried on the rectangular frame. Such filter plates are of conventional construction, and one example of same is shown in U.S. Pat. No. 4,749,482.

The overall filter press having a general arrangement as described above is conventional. The present invention is directed to improvements in a filter press which incorporates the general structural and functional relationships described above, and such improvements are described hereinafter with reference to FIGS. 2-8.

Figure 5:
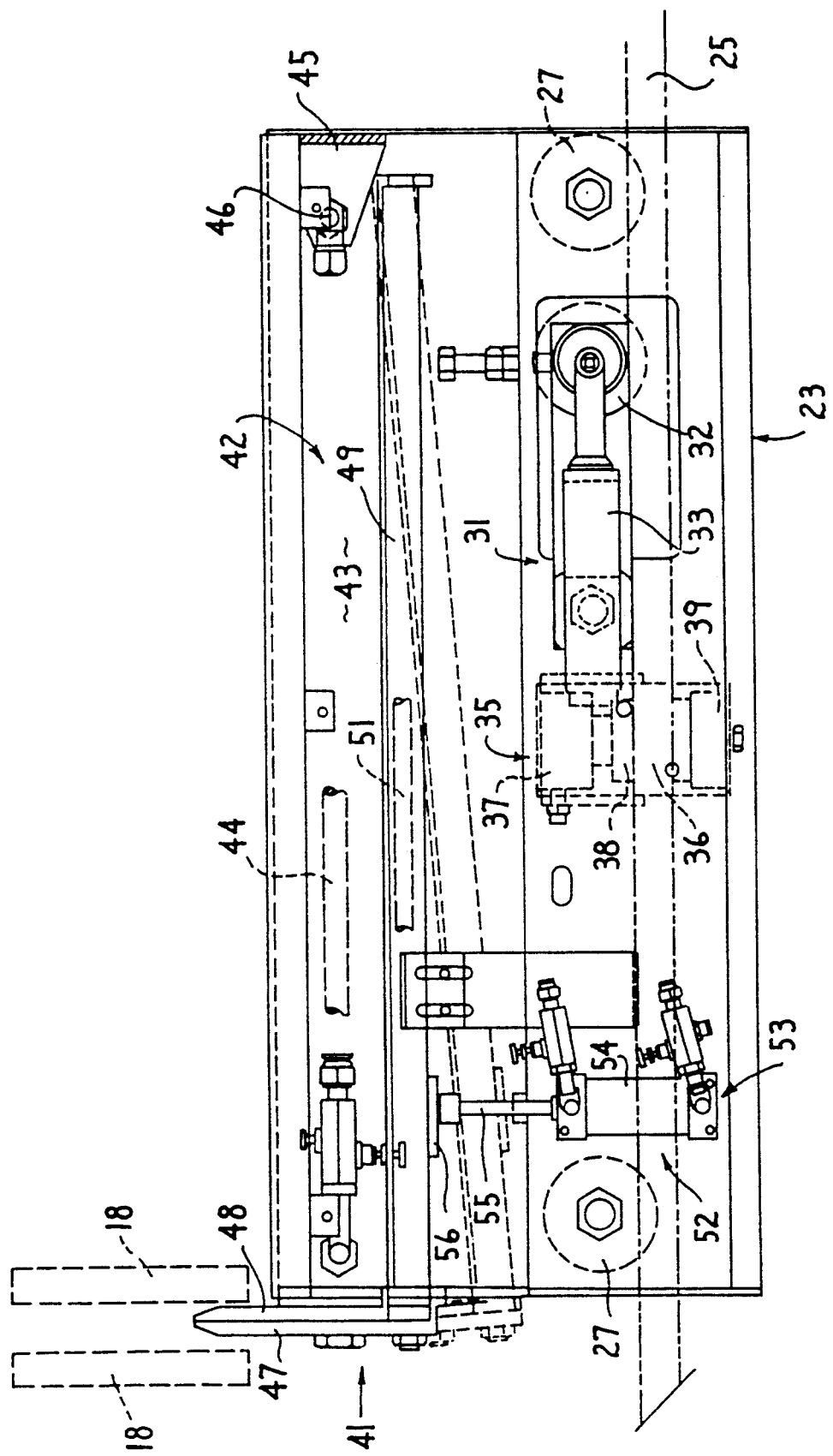
FIG. 5 is an enlarged side elevational view of the lower part of the shifter housing, with an outer side cover removed to show interior details with respect to the plate shifter mechanism.

To effect driving of the housing 22 longitudinally along the press, the one housing part 23, as illustrated by FIG. 5, has a drive unit 31 mounted thereon. This drive unit 31 includes a grooved drive roller 32 maintained in engagement with the upper side of the respective rod 25. The drive roller 32 is normally of a V-groove profile, and is preferably constructed of a plastic or rubberlike material so as to have high friction and hence a secure rolling driving engagement with the rod 25. The drive roller 32 is driven from a motor 33, this being a direct drive in the illustrated embodiment, although the invention also contemplates provision of a speed reducer such as a gear or chain-type speed reducer between the motor shaft and the driven roller 32. The motor 33 is a bi-directional air-driven rotary drive motor of conventional construction. The motor is mounted interiorly of the tubular housing part 23, and a drive shaft 34 (FIG. 6) for the roller 32 projects outwardly through the inner wall of the tubular housing part 23 so as to position the roller 32 in driving engagement with the adjacent rod 25. The roller 32 may, if desired, be maintained in spring-urged driving engagement with the rod, and one example of such arrangement is illustrated in aforementioned copending Ser. No. 07/904 406. The drive unit 31 is provided on only one of the housing parts 23, the other side of the shifter housing 22 being free of such drive unit.

A holding or braking device 35 (FIG. 5) is provided on one, and preferably both, housing parts 23 for braking engagement with the rods 25 when the drive unit 31 is de-energized. Each braking unit 35 includes a generally C-shaped yoke or carrier 36 disposed directly adjacent the sidewall of housing part 23 and mounted thereon through vertical slots (not shown) so that the carrier 36 can undergo limited vertical displacement relative to the housing part 23. The C-shaped configuration of the carrier 36 is oriented so that it projects toward and partially surrounds the adjacent support rod 25, and a small air-actuated pressure cylinder 37 is mounted adjacent the upper end of the carrier 36 and has the piston rod thereof joined to an upper brake pad 38. A lower brake pad 39 is secured to the carrier 36 adjacent the lower end thereof. The brake pads 38 and 39 are respectively disposed directly over and under the rod 25 and, when the cylinder 37 is pressurized, the upper pad 38 is pushed downwardly to react against the rod 25, thereby causing the carrier 36 to shift upwardly so that the lower pad 39 also reacts against the rod 25, thereby creating a braking or holding engagement with the rod 25 between the opposed pads 38 and 39. These pads are preferably constructed of hard plastic and/or rubberlike materials. A spring (not shown) is provided interiorly of the air cylinder 37 for returning it to its retracted position, and a further spring (not shown) coacts with the carrier 42 for normally urging it towards its lower position to disengage the lower pad 39 from the rod 25.

Each housing part 23 of the shifter assembly 21 also mounts thereon a plate shifter 41 (FIG. 5) which includes a fluid pressure cylinder 42 (herein referred to as the shift cylinder), preferably a double-acting air cylinder, having a conventional cylindrical housing 43 from one end of which a piston rod 44 slidably projects. The other end of cylinder housing 43 is secured to a bracket 45 through a pivot or trunnion 46, the latter projecting horizontally in perpendicular relationship to the longitudinal direction of the press so that the entire shift cylinder 42 is vertically swingable about this pivot.

A first shifter member or blade 47 is fixedly secured to the free end of the piston rod 44, and a second shifter member or blade 48 is fixedly secured to the end of the cylinder housing 43 through which the piston rod projects. The shifter blades 47-48 are both platelike members which extend transversely of the piston rod in generally parallel relationship so as to substantially directly overlap when the piston rod is in the retracted position illustrated by FIG. 5.

The plate shifter 41 also includes a guide assembly defined by an elongate guide tube 49 fixed to and extending parallel along the cylinder housing 43, and an elongate guide rod 51 slidably supported within the guide tube 49 with one end of rod 51 projecting outwardly though the blade 48 for securement to the blade 47. Whenever the piston rod 44 is extended, then guide rod 51 is also extended and prevents rotation of the blade 47.

The plate shifters 41 as disposed on opposite sides of the press are normally maintained in lowered inactive positions, substantially as illustrated by dotted lines in FIG. 5. To move the plate shifter into a raised positions for engagement with the filter press plates, which raised position is indicated by solid lines in FIG. 5, there is provided a lifting mechanism 52 mounted in each housing part 23 for cooperation with the respective plate shifter 41. The lifting mechanism 52 includes a lifting cylinder 53 which, like the shift cylinder 42, is a double-acting pneumatic cylinder having a cylindrical housing 54 fixed relative to the housing part 23 and a piston rod 55 slidably extendible from the upper end thereof. This piston rod 55, at the upper free end thereof, has a suitable cap which abuts against the underside of a plate 56 secured to the underside of the guide tube 49. Lifting cylinder 53 is normally maintained in a lowered or contracted position illustrated by dotted lines in FIG. 5 to normally maintain the plate shifter 41 in the lowered inactive position. When lift cylinder 53 is energized to extend the piston rod 55 upwardly, which upward extension is limited by an internal stop, then the plate shifter 41 is moved into the operative or shifting position illustrated by FIGS. 3 and 5.

Figure 6:
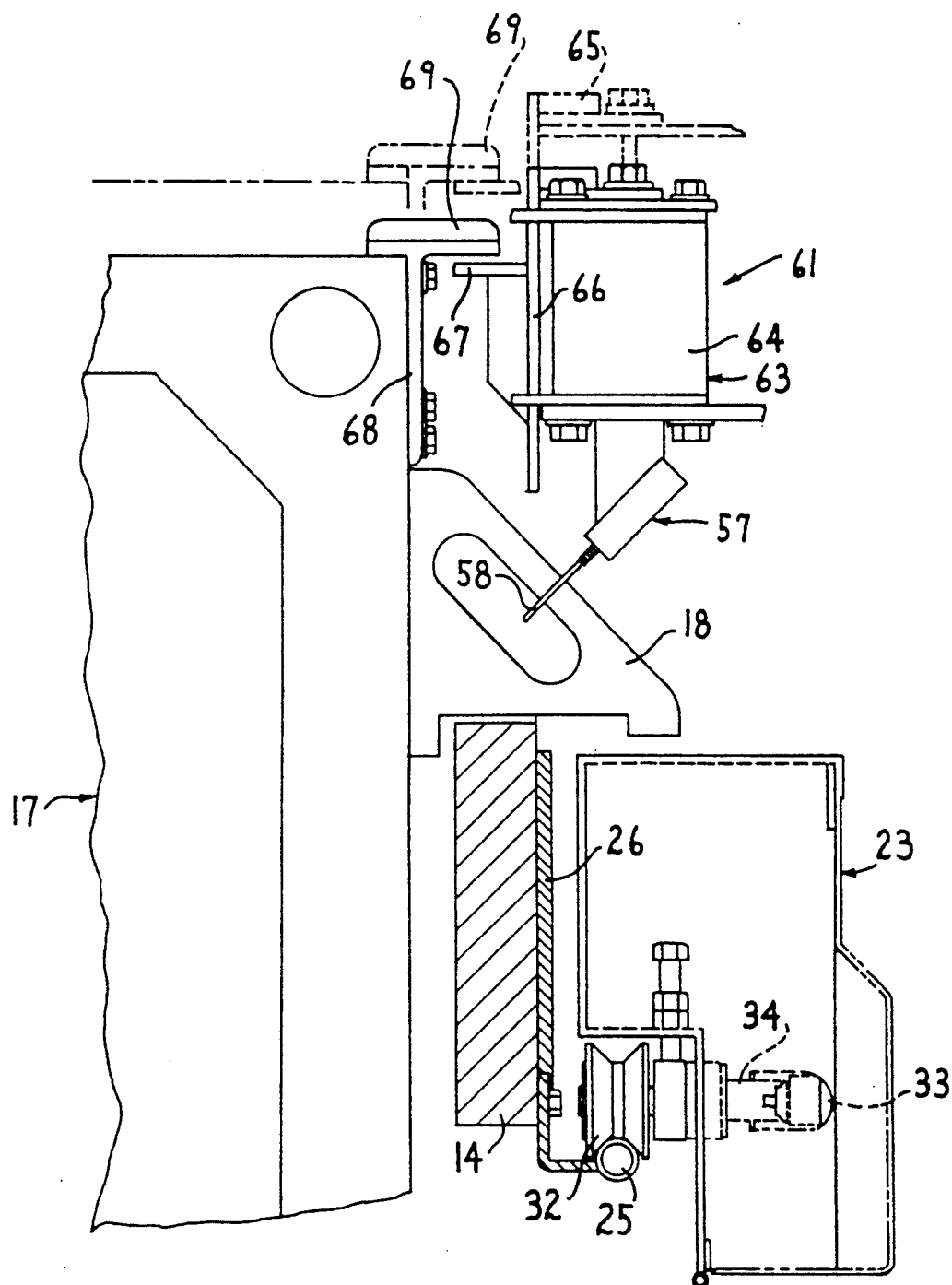
FIG. 6 is a fragmentary end elevational view, on an enlarged scale, showing a part of the right side of the arrangement shown in FIG. 4.
Figure 7:
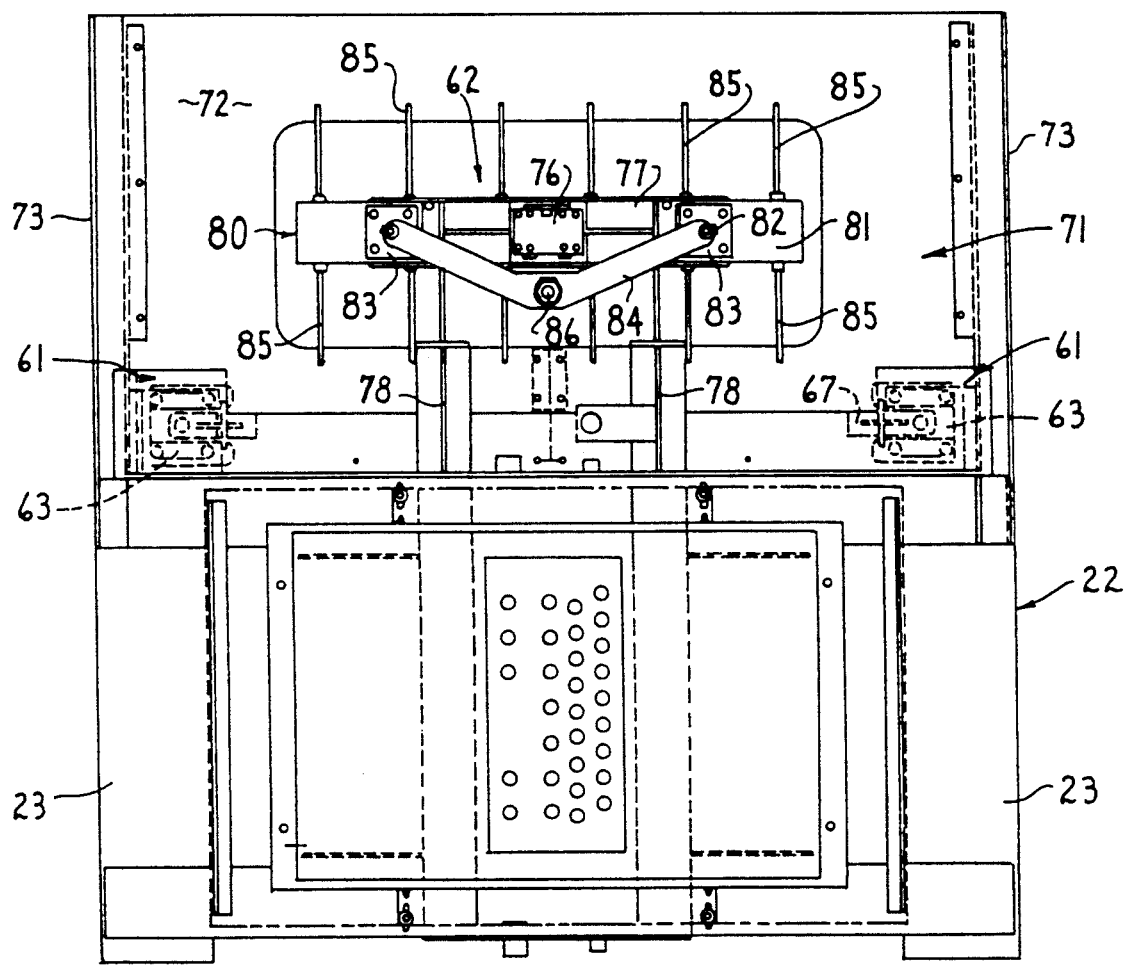
FIG. 7 is a top view of the arch-type shifter assembly.

To position the plate shifter 21 in adjacent and proper positional relationship relative to the leading or endmost filter plate 17 in the closed stack (i.e., the stack of plates which extends outwardly away from the stationary head 16), the plate shifter assembly 21 on one side of the housing 22 in the vicinity of but spaced upwardly from the blades 47-48, is provided with a plate sensor 57 (FIG. 6). This plate sensor 57, in the illustrated embodiment, comprises a conventional limit switch which is opened and closed by an elongate switching or sensing lever 58 which is normally maintained (as by spring-urged) in a position wherein it projects inwardly within a generally vertical plane so as to be positioned for contact with the handles 18 provided on one side of the filter plates 17. When sensing lever 58 contacts one of the plate handles 18, the lever 58 is horizontally swung or displaced and causes actuation (i.e., opening) of the sensor 57 to effect stoppage of the drive motor 33 of the shifter assembly 21.

Figure 3:
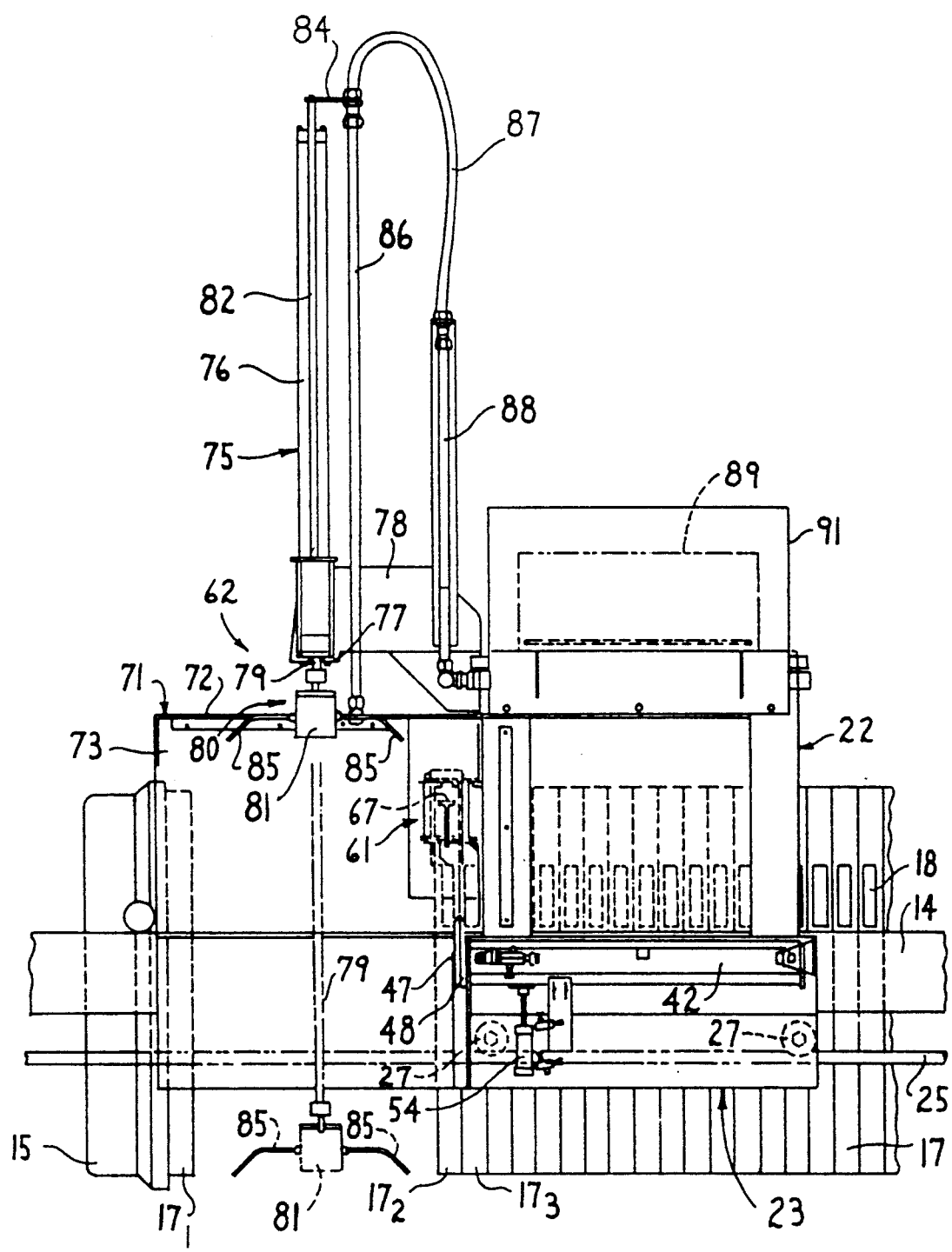
FIG. 3 is an enlarged side elevational view of the plate shifter assembly with a side cover of the shifter housing removed.
Figure 4:
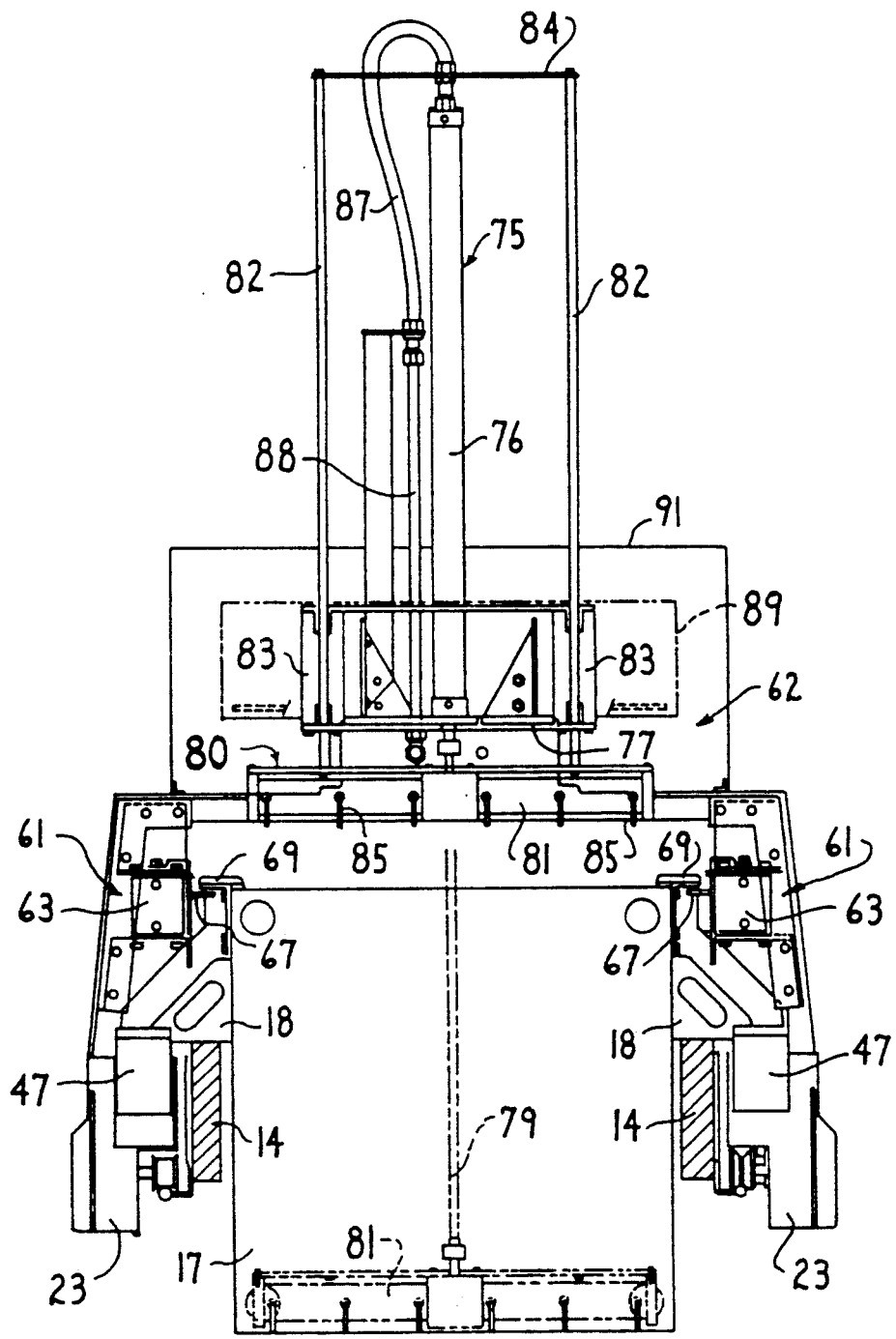
FIG. 4 is an end elevational view taken substantially from the leftward end of FIG. 3.

To assist in removal of sticky sludge from the filter plates during discharge, the filter press of this invention as shown in FIGS. 3 and 4 also incorporates a filter plate vibrating or bumping mechanism 61, and an air blow discharge assist mechanism 62, both of which are mounted on the housing 22 of the shifter assembly so as to be movable therewith as the shifter assembly effects sequential shifting of the filter plates into an open discharge position.

Considering first the vibrating or bumping device 61, a pair of such devices 61 are provided, being disposed on the opposite side legs of the arch-shaped housing 22 so as to be positioned adjacent opposite sides of the press. Each device 61 includes a fluid pressure cylinder 63, namely a double-acting air cylinder, having a housing or cylinder 64 fixed to the shifter housing 22 and oriented so that the piston rod of the cylinder 63 projects vertically upwardly through the upper end for vertical extension. The piston rod of each bump cylinder 63 has the upper outer end thereof fixed to a generally L-shaped bump or impact member 65 (FIG. 6) which includes a leg part 66 which projects downwardly and is vertically slidably guided along one side of the cylinder housing 64. This leg part 66 in turn has a bumping tab or projection 67 projecting horizontally therefrom inwardly toward the adjacent upper corner of a filter plate 17. Each filter plate 17 is also provided with a lifting bracket 68 fixedly secured to each upper corner thereof. The lifting bracket includes a cantilevered lifting tab 69 which projects horizontally outwardly in a sideward direction away from the upper corner of the filter plate, whereby the lifting tab 69 projects so as to be disposed above and overlap the bumping tab 67, the latter tabs being normally vertically spaced a small distance apart when the plates 17 are supported on the press rails 14 by the handles 18 and the bump cylinders 63 are in their retracted (i.e., lowered) positions.

The bump cylinders 63 are mounted on the shifter housing 22 at a position whereby the bump tabs 67 are sidewardly aligned directly under the lifting tabs 69 associated with the front or endmost filter plate associated with the closed stack, such as the filter plate designated $17_3$ in FIG. 3.

The bump cylinders 63 are normally maintained in the lower retracted position and are activated only during the discharge cycle of the press. When the press is in the discharge cycle, pressurized air is rapidly and alternately supplied first into the lower ends and then into the upper ends of the bump cylinders 63, which cycle is preferably repeated two or three times in rapid succession, to cause at least two rapid cycles of lifting and lowering of the endmost filter plate $17_3$ relative to the adjacent plate $17_4$. This lifting is illustrated by the dotted line position of the filter plate in FIG. 6. The lifting is normally no more than about two inches, and occurs with sufficient rapidity so as to effectively result in free fall of the lifted filter plate until the handles 18 of the lifted plate contact the press rails 14 and impose a bump or impact on the plate which is effective in at least partially loosening the sticky filtrate or cake which is adhered to the plate. The vertical displacement of the plate $17_3$ relative to adjacent plate $17_4$ also assists in effecting at least partial loosening of the sticky filtrate relative to the filter cloths of the adjacent filter plates. Considering now the air blow discharge assist mechanism 62, and referring specifically to FIGS. 3 and 4, this mechanism is mounted on a generally arch-shaped or tunnel-like shroud 71 which is fixed to one end of the shifter housing 22 and projects longitudinally along the press in a direction toward the movable head 15 so as to effectively enclose at least opposite sides of the gap or discharge region defined between the opposed pair of opened plates, such as represented by the plates $17_2$ and $17_3$ in FIG. 3. This shroud 71 effectively comprises and constitutes an extension of the shifter housing 22 in that it includes a top wall 72 which extends sidewardly across the press in upwardly spaced relationship from the filter plates, and a pair of sidewall portions which project downwardly from the top wall 73 adjacent opposite sides of the press in sideward straddling relationship to the filter plates.

The discharge assist mechanism 62 includes a pressure cylinder 75, preferably a double-acting pneumatic cylinder. This pressure cylinder 75, herein referred to as the blow or discharge cylinder, includes a cylinder housing 76 which has a lower end thereof secured to a mounting plate 77, the latter being fixed to support arms 78 which are fixed to and project outwardly from the top wall of the shifter housing 22. The discharge cylinder 75 is vertically oriented and has the piston rod 79 thereof disposed so as to slidably project vertically downwardly through the lower end thereof, which piston rod 79 in turn is coupled to an air discharge head assembly 80 which includes a manifold block or nozzle head member 81 which is horizontally elongated transversely (i.e., perpendicularly) across the press. This manifold block 81 has a transversely extending length which is of a magnitude similar to the width of the filter plates.

The manifold block 81 also has a pair of vertically upwardly projecting guide rods 82 fixed thereto in straddling relationship to the piston rod 79. These guide rods 82 are vertically slidably supported in bearing blocks 83 secured to the mounting plate 77, and the upper free ends of the guide rods 82 are joined together by a connecting plate 84.

The transversely extending manifold 81 has rows of air discharge nozzles 85 projecting outwardly from opposite sides thereof so that the nozzles 85 of one row project generally toward the exposed face of the open filter plate (such as plate $17_2$), and the nozzles 85 of the other row project generally toward the exposed face on the endmost filter plate of the closed stack (such as plate $17_3$). The opposed rows of nozzles 85 project horizontally outwardly in opposite directions from the manifold 81 through a sufficient extent longitudinally of the filter press so that the discharge ends of the nozzles 85 are positioned closely adjacent the exposed faces of the opposed open filter plates $17_2$ and $17_3$ when the manifold 81 is moved vertically downwardly into the gap or region between the opposed opened filter plates, as explained below.

The manifold 81 has air passages (not shown) disposed interiorly thereof for communication with the nozzles 85, which nozzles are disposed within a generally transverse horizontally extending row in substantially uniformly spaced relationship so that a plurality of nozzles are disposed closely enough together to effect discharge of several adjacent airstreams against the exposed face of the filter plate, with the airstreams traversing downwardly during operation of the discharge assist mechanism 62. The manifold 81 is supplied with pressurized air through an air supply conduit 86, the lower end of the which is fixed to the manifold 81. The upper end of conduit 86 is fixed to the connecting plate 84 so that the conduit 86 is vertically displaceable in unison with the guide rods 82. A flexible air supply hose or conduit 87 has one end thereof coupled to the upper end of supply conduit 86, and the other end of hose 87 couples to an air supply conduit 88 which is fixed to the shifter housing 22.

The shifter housing 22 mounts thereon a control housing, indicated diagrammatically at 89 in FIG. 3, the latter being surrounded by a suitable cover 91. The control housing contains therein the pneumatic and electrical controls for operation of the press, with the pneumatic controls (including valves and other conventional pneumatic control devices) being supplied with pressurized air in a conventional manner from an exterior pressure source.

As illustrated by FIGS. 3 and 4, the blow cylinder 75 normally maintains the air discharge head 80 (namely the manifold 81 and nozzles 85) in an upper inactive position wherein this air discharge head 80 is spaced upwardly from the upper edges of the filter plates 17. The air discharge head 80 is maintained in this upper position by closing off the blow cylinder 75 so that air is locked in the cylinder to maintain the piston rod in the upwardly contracted position. During air-assisted discharge of filtrate from the filter plates, however, then cylinder 75 is energized to extend the head 80 downwardly into the gap between the opposed and spaced pair of opened plates and, during this downward traverse, air is constantly discharged through the nozzles 85 so that a plurality of airstreams are directed against and moved vertically downwardly across the exposed faces of the filter plates to assist in discharging the sticky filtrate. The air discharge head 80 moves downwardly a sufficient stroke so as to effectively traverse the complete face of the filter plates, and then the blow cylinder 75 is reversed and moved upwardly to its upper position, at which time the air supply to the manifold 81 is terminated and the cylinder 75 is pneumatically held in its raised position.

Figure 8:
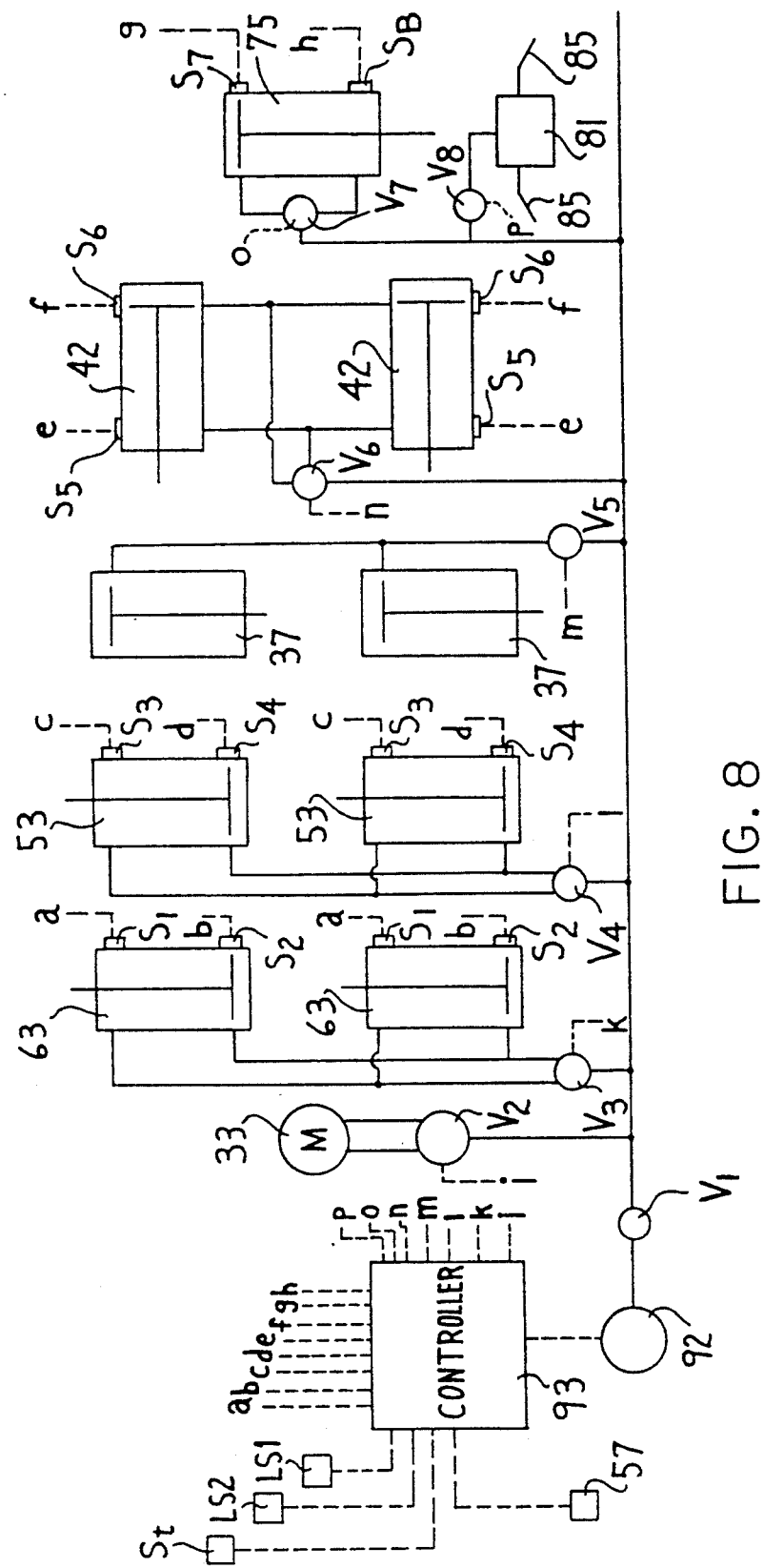
FIG. 8 is a partial schematic of the control and driving system.

Referencing now FIG. 8, there is diagrammatically illustrated pneumatic and electrical control relationships associated with the press so as to effect automatic sequencing of the shifter assembly 21 to sequentially effect discharge of cake from between adjacent pairs of filter plates. More specifically, pressurized air is supplied from an external source 92, such as a compressor, through a main control valve $V_1$, the latter controlling the supply pressurized air to the press. One valve $V_2$ is provided for controlling flow of air to the two supply ports of the motor 33 so as to not only control energization of the motor 33, but also the direction of rotation thereof. A valve $V_3$ controls flow of air to the double-acting bump cylinders 63, a valve $V_4$ controls flow of air to the double-acting lift cylinders 53, a valve $V_5$ controls flow of air to the brake cylinders 37, a valve $V_6$ controls flow of air to the double-acting shift cylinders 42, a valve $V_7$ controls flow of air to the double-acting discharge cylinder 75, and a valve $V_8$ controls flow of air to the manifold 81. These valves are of conventional configuration, and are typically electrically-actuated by appropriate signals received from a master press controller 93, the latter preferably comprising a microprocessor. The controller 93 provides appropriate control signals designated i through p to the valves $V_1$ through $V_8$ respectively so as to control the operation thereof.

The controller 93 in turn receives appropriate signals designated a through h from position sensing switches associated with the various pneumatic drivers, specifically the air cylinders 42, 53, 63 and 75.

More specifically, each bump cylinder 63 has position sensors such as magnetically-actuated reed switches $S_1$ and $S_2$ associated therewith for sensing the respective extended and contracted positions, with the two switches $S_1$ being connected in series, and the two switches $S_2$ connected in series, whereby each cooperating pair emits a control signal a or b to the controller 93 only when both cylinders 63 are in the respective extended or contracted positions.

Similarly, the lifting cylinders have switches $S_3$ and $S_4$ (such as magnetic reed switches) which designate the respective extended and contracted positions, with switches $S_3$ being connected in series and emitting a control signal c to controller 93 only when both lift cylinders are extended, and similarly switches $S_4$ being connected in series to emit a control signal d to controller 93 only when both lift cylinders are in the lowered or contracted positions.

The shift cylinders 42 have position sensors formed as switches $S_5$ and $S_6$ (such as Hall effect sensors) which respectively define the extended and contracted positions of the shift cylinders 42. The two switches $S_5$ are connected in series, as are the two switches $S_6$, and these respectively emit control signals e and f to the controller 93.

Lastly, blow cylinder 75 has position sensors $S_7$ and $S_8$, again normally formed as magnetic-actuated reed switches, for respectively indicating the upper retracted and lower extended positions. These switches in turn emit control signals g and h to the controller 93.

The controller 93 emits control signals to the various valves, such as $V_1$ through $V_8$, in response to control signals a through h as received from the various air cylinders so as to ensure proper automatic sequencing of the various devices and mechanisms.

The controller 93 also receives a signal from the position sensor 57 when the latter contacts and is activated by the handle 18 on the endmost filter plate 17 of the stack so as to effect stoppage of the drive motor 33.

The press 11 is also normally provided with appropriate position sensors such as limit switches LS1 and LS2 disposed adjacent opposite ends of the support rod 25, which limit switches sense the presence of the shifter housing 22 when it reaches the end positions so as to control the shifter assembly 21. For example, limit switch LS1 is normally disposed adjacent the leftward end of the press in FIG. 1 so as to function as a "home" sensor to normally maintain the shifter assembly 21 in a stationary "home" position adjacent this end of the press, such as during the filling cycle of the press. The other limit switch LS2 is disposed adjacent the other end of the press, namely the rightward end in FIG. 1, to sense when the shifter assembly 21 has moved along and effected sequential opening of all of the plates, whereupon the switch LS2 effects reversal in the rotation driving of motor 33 so as to return the entire shifter assembly 21 to its home position.

There is preferably provided an additional switch $S_t$ which is effectively a start switch which can be manually activated if desired so as to permit initiation of the press opening and discharge cycle.

The operation of the filter press of the present invention, as explained above, will now be briefly described to ensure a complete understanding thereof.

The shifter assembly 21 will normally be maintained at the leftwardmost end (FIGS. 1 and 2) of the press, this being the normal home position. When emptying of the press is desired, a signal will be transmitted to the press controller 93, either manually from the start switch $S_t$ or from a portion of an automatic controller, such as a microprocessor, which controls the overall press operation. Controller 93 then supplies a signal to valve $V_2$ to effect opening thereof so that pressurized air will be supplied to motor 33 to effect "forward" rotation thereof. This drives roller 32 and causes the entire shifter assembly 21 to move forwardly (rightwardly in FIGS. 1 and 2) along the rods 25 until the shifter housing 22 passes over the head 15 (which has already been moved into an open position wherein it is spaced a predetermined distance from the endmost movable filter plate $17_1$) and over the endmost ones of the closed stacked filter plates 17. In this regard, the endmost filter plate $17_1$ is normally fixed to and moves with the movable head 15. When the shifter assembly 21 approaches the endmost movable plate $17_2$, the plate sensing lever 58 contacts the handle 18 of the endmost plate and is angularly deflected through a small angle. This activates the plate sensor 57 so as to transmit a signal to the controller 93 which then stops the motor 33. A signal m is emitted to the valve $V_5$ which energizes the brake cylinder 37 so as to apply the brake devices 35. After a predetermined but short time delay as controlled by the controller, the controller 93 then emits a signal k to valve $V_3$ which permits cyclic upand-down actuation of the bump cylinders 63, preferably for at least two up-and-down cycles. That is, the controller 93 emits appropriate signals to valve $V_3$ so as to cause rapid extension followed by rapid contraction of the cylinders 63, this being performed preferably at least twice in rapid sequence. This causes the bump tabs 67 to engage the filter plate lifting tabs 69 and effect rapid upward lifting of solely the endmost filter plate $17_2$ a small distance, followed by downward dropping of the plate $17_2$ against the rails 14 due to the rapid retraction of the cylinders 63. This cycle is preferably repeated at least two times in sequence. During this cyclic lifting and lowering of the filter plate $17_2$, the downwardly free fall of the plate and its impact on the rails 14, which is referred to herein as vertical bumping of the filter plate, is effective for causing at least partial dislodgement or loosening of the sticky cake which is adhered to not only the exposed face of the plate $17_2$, but also to the face of plate $17_2$ which faces the adjacent plate $17_3$. This bumping of the plate has been observed to effect sufficient loosening to create a slight gap between the sticky cake and the filter cloth, particularly adjacent the upper perimeter of the cloth and cake. After the controller 93 completes the cyclic activation of the bump cylinders 63, and return of the bump cylinders to the lower retracted positions is sensed by the position sensors $S_2$ so as to emit a control signal b to the controller 93, then the controller 93 emits an appropriate control signal o so as to activate the air discharge assist device 62.

More specifically, valve $V_7$ is activated to supply air to the upper end of blow cylinder 75, and simultaneously valve $V_8$ is activated to supply air to the manifold 81. The head assembly 80 is then moved downwardly into the gap between the opposed open plates $17_1$ and $17_2$. The nozzles 85 are disposed closely adjacent the opposed faces of the open filter plates, and in fact the nozzles are preferably oriented so they eject a plurality of sidewardly adjacent airstreams which are directed outwardly but downwardly (such as at an angle of about 45°) toward the opposed exposed face of the filter plate. These airstreams are able to enter into the narrow gaps created between the filter cake and the underlying filter cloth and effectively assist in peeling the sticky filter cake away from the filter cloth. As the head 80 is lowered vertically downwardly between the opposed filter plates throughout substantially the vertical extent thereof, these airstreams are directed outwardly and downwardly generally into the interface region between the sticky cake and the filter cloth so as to effectively progressively peel the filter cake away from the cloth as the nozzles move vertically downwardly. Of course, the weight of the cake itself may additionally assist in peeling away the sticky cake as a greater portion of the cake is peeled outwardly away from the underlying filter cloth.

After the blow head 80 reaches it lowermost position, then position sensor $S_8$ emits a signal h to controller 93 which emits a control signal to valve $V_7$ so as to reverse flow of pressurized air to blow cylinder 75, thereby causing the cylinder 75 and the head assembly 80 to be retracted upwardly into their uppermost position as illustrated by solid lines in FIG. 3. During this upward retraction, however, air is continually supplied to manifold 81 so as to effect further blowing of airstreams against the opposed filter plates to effect some additional supplemental cleaning thereof, if necessary. Upon reaching the uppermost position, position sensor $S_7$ emits a signal g to the controller which then deactivates the appropriate valves to hence deactivate supply of pressure fluid to the cylinder 75 and manifold 81, whereby the cylinder is pneumatically locked in the raised position.

Upon receipt of signal g at the controller, the controller then emits a signal l so that valve $V_4$ is controlled to supply pressurized air to the lower ends of lifting cylinders 53 to effect extension thereof. When the cylinders 53 effect upward lifting of the plate shifter 41 into its upper position, as sensed by the position sensors $S_3$, then a signal c is transmitted to the controller 93 which in turn then emits a signal to control the valve $V_6$ of the shift cylinders 42. At this time, the shift blades 47–48 have the upper ends thereof inserted into the narrow gap between the handles 18 of the endmost pair of closed plates $17_2$ and $17_3$. Energization of cylinders 42 results in the movable shifting blades 47 being projected outwardly (leftwardly in FIGS. 3 and 5) toward the movable head 15, whereby the movable blades 47 contact the side handles 18 on the endmost plate $17_2$ so as to slide this filter plate along the rails 14 toward an open position adjacent the head 15. When the shift cylinders 42 reach their fully extended positions, the shifted plate $17_2$ is disposed in an open position wherein it abuts the plates stacked against the movable head 15, and is spaced a predetermined longitudinal distance from the endmost plate $17_3$ of the closed stack. During this extension of the shift cylinders 41, the stationary blade 47 will, if necessary, due to slight shifting of the housing 22, react against the adjacent plate $17_3$ to prevent any significant movement of the shifter housing 22. When the controller 93 receives the signal e indicating full extensions of the shifter cylinders 42, then the controller 93 signals valve $V_6$ so that the shift cylinders 42 are retracted, followed by lowering of the lift cylinders 53. The lowered lift cylinders 53 emit a control signal d to controller 93 which signals completion of the discharge cycle for one pair of plates.

The controller 93 will initiate a new cycle by transmitting appropriate signals which release the brake devices 35 and which again energize the motor 33 to effect forward rotation until the switching sensor 58 contacts the handle of the next adjacent plate 17₃, whereupon the complete cycle is again automatically carried out in the same manner as described above.

The shifting and discharge cycles continue until the last movable filter plate 17 is shifted and discharged of filtrate, at which time the shifter housing is again moved forwardly until contacting the limit switch LS2, at which time the controller signals the motor 33 so that the rotational direction is reversed. This causes the entire shifter assembly 21 to then be moved rearwardly (leftwardly in FIGS. 1 and 2) along the rods 25 until the shifter assembly reaches its home position as sensed by the switch LS1 which then deactivates the shifter assembly until such time as a new start signal is received.

It will be understood that the filtrate or cake as discharged from the plates is deposited into a suitable collecting bin or the like as disposed below the press.

The pneumatic and electrical controls illustrated in FIG. 8 are only partially and schematically shown since it will be understood that the specific valves, switches and other related controlling devices are themselves conventional, and can assume many different configurations so as to still provide the desired control functions, as will be readily apparent to those of ordinary skill in such technology.

While the blow discharge assist mechanism 62 as described above, wherein the vertically-extending blow cylinder 75 is provided for controlling the vertical cycling movement of the discharge head 80, is desirable from a structural and operational simplicity standpoint, it will be appreciated that such arrangement also does require significant overall height in order to have all of the moving components vertically aligned. Thus, other drive mechanisms can be provided for controlling vertical cyclic movement of the blow head assembly 80. Examples of additional drives for the blow discharge assist mechanism are illustrated in FIGS. 9 and 10.

Figure 9:
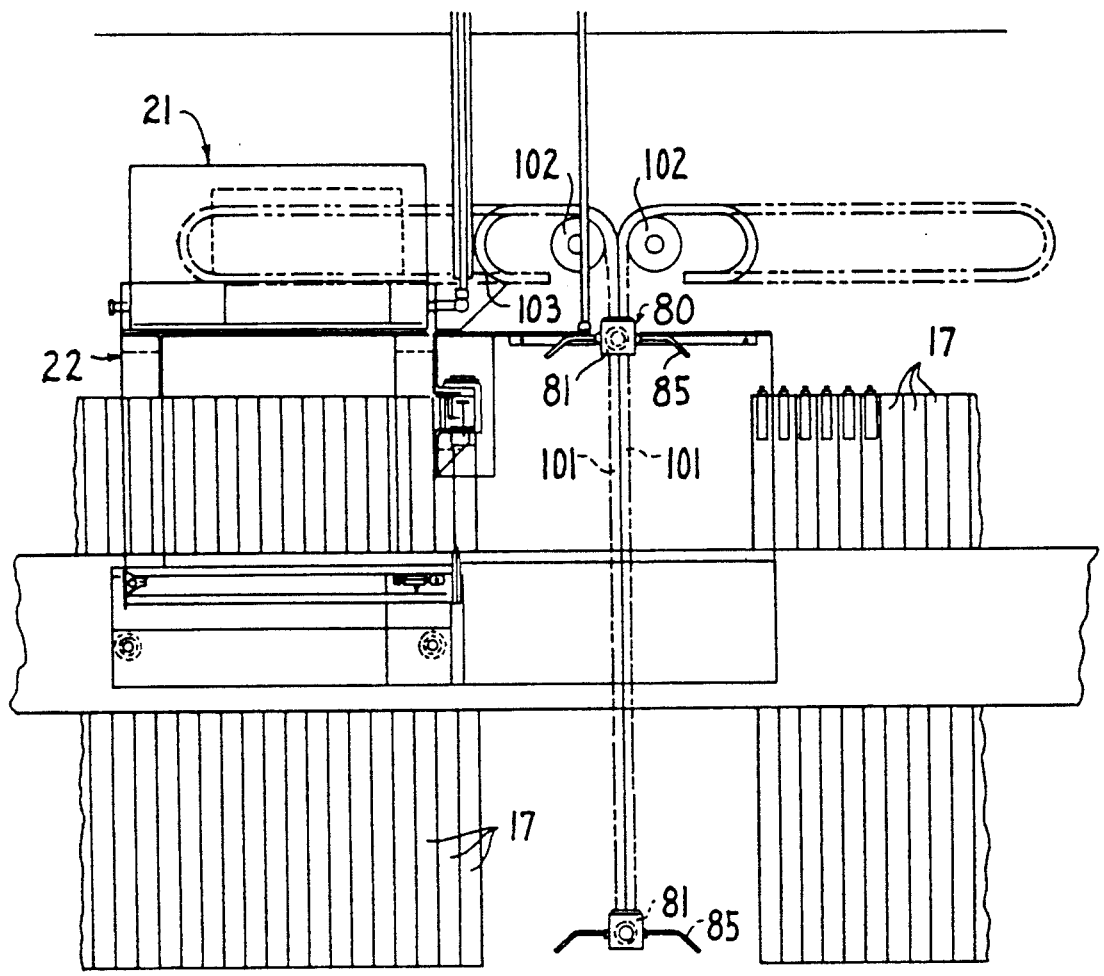
FIG. 9 is an end elevational view similar to FIG. 4 but illustrating a variation of the support and drive for the air blow device.

More specifically, in FIG. 9 the blow head assembly 80 is driven by and connected to a pair of elongate chains 101 which abut back-to-back where they connect centrally to the manifold 81. The chains 101 project upwardly and individually pass over driven counter-rotating drive sprockets 102 which are rotatably supported on the shifter housing at an elevation above the filter plates. These drive sprockets cause the chains 101 to retract horizontally, either sidewardly of the press or longitudinally thereof, into appropriate guide tracks indicated diagrammatically at 103. The chains 101 are of the type which are capable of effecting driving both by pushing and pulling. That is, the links of the chain have direct solid abutments therebetween which permit pushing forces to be transmitted along the chain, and which permit the chain links to hinge only in a single direction away from the straight line condition, whereby when the chains are disposed in back-to-back relationship, hinging of the chains is effectively prevented and the chains can thus provide a rather rigid link for controlling the up-and-down movement of the manifold head. The construction of such chain is conventional. The sprockets can be driven through suitable gears by a single reversible drive motor if desired, which drive motor can be controlled by appropriate signals received from the controller 93.

The arrangement of FIG. 9 is desirable for use in those situations where minimal height is available, since such transversely (i.e., horizontally) projecting drive arrangement enable the overall height of the press to be reduced.

FIGS. 10A and 10B illustrated another variation of a drive device for the blow discharge assist mechanism, which modified drive device is also of minimal height. In this embodiment, the mechanism 62 includes a double-acting pneumatic blow cylinder 104 which is oriented horizontally in the sideward direction of the press so that the piston rod is slidable horizontally transversely of the press along the centerline 105. The piston rod of the cylinder 104 projects outwardly from one end and has a bracket 106 secured thereto, the latter being coupled by a pivot 107 to the upper free end of one upper link 108 of a scissor mechanism 109, specifically a lazy tong mechanism. This mechanism 109 includes a further upper link 110 pivotally joined to link 108 by central pivot 111, and the upper end of the link 110 is joined by a pivot 112 to a stationary bracket 113 secured to the shifter housing. Links 108, 110 in turn have the lower ends thereof pivotally joined to respective upper ends of links 114 and 115, the latter being centrally joined by a pivot 116, and having their lower ends pivotally joined at 117 and 118 to a support bar 119 which mounts and extends lengthwise along the manifold 81 of the head assembly 80. The connection of pivot 118 to the support 119 involves a slide member 121 which is movable lengthwise along the support bar 119 when the mechanism 109 is moved from the raised contracted position of FIG. 10A to the lowered extended position of FIG. 10B.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a filter press including a frame having a pair of horizontally elongate and generally parallel side rails which extend lengthwise of the press and are sidewardly spaced apart, a first head structure stationarily mounted adjacent one end of said rails, a second head structure mounted on said rails for movement toward and away from said first head structure for respective closing and opening of said press, a plurality of filter plates movably disposed in generally side-by-side relationship to define a horizontally extending stack between said first and second head structures when said press is closed, each said filter plate mounting thereon a respective filter member which is independent of the filter members mounted on the other filter plates, said filter plates extending transversely between and being slidably supported on said side rails, each movable filter plate having parts which project outwardly from opposite vertical side edges thereof, and a shifter assembly for effecting shifting of individual said filter plates along the side rails toward the second head structure when said second head structure is in an open position, the improvement wherein said shifter assembly comprises:

a shifter housing having a pair of opposite housing parts which are disposed on opposite sides of the press so that each said housing part is disposed adjacent a respective one of said side rails, said housing parts being supported for movement lengthwise along the press on an elongate guide structure which is fixed relative to and extends generally longitudinally parallel with and along a respective one of said side rails, said shifter housing also including a bridging part which extends transversely of said press and rigidly joins said housing parts together;

drive means mounted on only one of said housing parts for linearly drivingly moving said housing lengthwise of said press generally along and parallel to said side rails, said drive means including a drive motor mounted on said one housing part and drivingly coupled to a driving member which is drivingly engaged with an elongate reaction member which is fixed relative to the respective side rail and extends lengthwise therealong;

a plate sensing structure mounted on said housing for sensing an endmost said filter plate as associated with the closed stack of filter plates which projects horizontally away from said first head structure for stopping said drive means upon sensing said endmost plate;

a plate shifter mechanism mounted on each said housing part and cooperating with the projecting part on a respective side of the endmost filter plate of the closed stack for effecting slidable shifting of the endmost plate along the side rails away from the closed stack toward the opened second head structure so as to position the shifted plate in an open position wherein it faces but is spaced a selected distance from the next endmost plate of the closed stack, whereby said first-mentioned and said next endmost plates are spaced apart so as to define a vertically extending clearance gap therebetween to permit downward discharge of filtrate from opposed faces thereof;

plate bumping means mounting on said housing and cooperating solely with the endmost plate of the closed stack for imposing a bumping force onto the endmost plate of said closed stack in a direction generally transverse with respect to said side rails to effect loosening of filtrate adhered to the respective filter plate;

a discharge assist mechanism mounted on said housing for simultaneously directing pressurized streams of air against opposed faces of said first-mentioned and said next endmost plates when said first-mentioned endmost plate is in said open position and said next endmost plate is still in contact with the closed stack to assist in discharging filtrate from the opposed faces thereof, said mechanism including an air discharge head assembly which is insertable into said gap and movable therein transversely of said press for simultaneously directing pressurized streams of air against the opposed faces of the two plates defining said gap, said mechanism including a driving device connected to said air discharge head assembly for effecting cyclic movement thereof into and out of said gap; and control means for (1) automatically stopping said shifter housing mechanism after said sensing structure senses the endmost plate of said stack and stops said drive means, (2) for thereafter activating said bumping means for effecting transverse bumping of solely the endmost filter plate of the closed stack, (3) for thereafter activating the driving device of said air discharge assist mechanism for causing the air discharge head assembly to move into the gap between the adjacent opened plates to discharge pressurized airstreams against the opposed faces thereof to assist in dislodging sticky filtrate therefrom, (4) for thereafter moving the air discharge head assembly out of the gap, (5) for then activating the shifter mechanism to shift the endmost plate of the stack into an open position, and (6) for thereafter automatically reactivating said drive means to forwardly advance the shifter housing toward the next endmost plate of said closed stack, and then repeating the aforementioned steps.

2. A filter press according to claim 1, wherein said bumping means includes a pair of bumping devices mounted on opposite sides of said shifter housing, each said bumping device being mounted adjacent one of said housing parts, each bumping device having a vertically extendible and contractible bumping member which can be cyclicly vertically displaced, each said filter plate having a pair of lifting tabs mounted thereon so as to project outwardly from opposite sides of the respective plate, said lifting tabs being normally positioned so as to be disposed directly over and engaged and lifted upwardly by the bumping members when the bumping members are vertically raised so as to effect vertical lifting of the filter plate, in its entirety, upwardly away from the side rails through a limited vertical extent, said bumping devices permitting substantially vertical free fall of the lifted filter plate when the bumping devices are retracted so that the filter plate is dropped on the side rails.

3. A filter press according to claim 1, wherein said air discharge head assembly includes two generally horizontally elongate rows of nozzles which are disposed transversely of the press and oriented so as to discharge airstreams in generally opposite directions, one row of nozzles being directed toward and positioned closely adjacent the exposed face of one filter plate defining the gap, the other row of nozzles being directed toward and positioned closely adjacent the exposed face of the other filter plate defining the gap, and said driving device effecting movement of the head assembly from a storage position disposed above the filter plates vertically downwardly into and through the gap so as to cause the pressurized airstreams to first contact the opposed faces of the filter plates toward the upper edges thereof with the airstreams progressively moving vertically downwardly along the faces to assist in discharging the filtrate adhered thereto.

4. A filter press according to claim 3, wherein said bumping means includes a pair of bumping devices mounted on opposite sides of said shifter housing, each said bumping device being mounted adjacent one of said housing parts, each bumping device having a vertically extendible and contractible bumping member which can be cyclicly vertically displaced, each said filter plate having a pair of lifting tabs mounted thereon so as to project outwardly from opposite sides of the respective plate, said lifting tabs being normally positioned so as to be disposed directly over and engaged and lifted upwardly by the bumping members when the bumping members are vertically raised so as to effect vertical lifting of the filter plate, in its entirety, upwardly away from the side rails through a limited vertical extent, said bumping devices permitting substantially vertical free fall of the lifted filter plate when the bumping devices are retracted so that the filter plate is dropped on the side rails.

5. A filter press according to claim 4, wherein said driving device for said discharge assist mechanism includes a fluid pressure cylinder for controlling up and down movement of said head assembly through said gap, and wherein each said bumping device includes an air cylinder for controlling cyclic displacement of the bumping member.

6. A filter press according to claim 5, wherein said housing includes a tunnel-like shroud portion which includes an upper wall which extends transversely across the gap at an elevation above the filter plates and a pair of side portions which project downwardly on opposite sides of the gap outwardly of the filter plates for substantially protectively enclosing the gap.

7. A filter press according to claim 6, wherein the air cylinder associated with said discharge assist mechanism is mounted on and projects vertically upwardly from said shroud and includes a piston rod which is slidably projectable vertically downwardly into said gap, said piston rod having a generally horizontally elongate manifold fixed to the lower end thereof and extending generally transversely of said press, said manifold having an air supply conduit connected thereto, said manifold also having said rows of nozzles mounted on opposite sides thereof, said nozzles being oriented so as to discharge pressurized airstreams outwardly toward but angled downwardly relative to the exposed faces of the adjacent filter plates.

8. In a filter press including a frame having a pair of horizontally elongate and generally parallel side rails which extend lengthwise of the press and are sidewardly spaced apart, a first head structure stationarily mounted adjacent one end of said rails, a second head structure mounted on said rails for movement toward and away from said first head structure for respective closing and opening of said press, a plurality of filter plates movably disposed in generally side-by-side relationship to define a horizontally extending stack between said first and second head structures when said press is closed, each said filter plate mounting thereon a respective filter member which is independent of the filter members mounted on the other filter plates, said filter plates extending transversely between and being slidably supported on said side rails, each movable filter plate having parts which project outwardly from opposite vertical side edges thereof, and a shift assembly for individually and sequentially shifting said filter plates along the side rails toward the second head structure when said second head structure is in an open position, the improvement comprising:
 a filter plate bumping device for directly engaging solely the endmost plate of said closed stack for effecting bumping of said last-mentioned plate transversely relative to said side rails to effect loosening of the filtrate adhered to said plate; and
 discharge assist means for directing a pressurized stream of air against the exposed face of the endmost plate of said closed stack to assist in dislodging the filtrate adhered to said plate, said discharge assist means including an air nozzle assembly for directing a pressurized airstream at the exposed face of said plate, and a drive device for moving the nozzle generally parallel across the face.

9. A filter press according to claim 8, wherein the plate bumping device includes means for engaging opposite sides of the respective plate to effect vertical lifting thereof upwardly away from the rails followed by substantially downward dropping of the plate onto the rails.

10. A filter press according to claim 8, wherein the shift assembly includes a housing which is supported for movement lengthwise along the press and includes housing parts disposed adjacent apposite sides of the press, and said plate bumping device including a pair of bumping units, each said bumping unit being mounted on a respective one said housing part adjacent one side of the press, said bumping units being vertically movable for effecting vertical lifting of the endmost filter plate upwardly out of engagement with the side rails, said bumping unit permitting substantially vertical free fall of the lifted filter plate downwardly onto the side rails.

11. A filter press according to claim 10, wherein the housing includes a tunnel-like shroud portion which extends transversely across the press at an elevation above the filter plates and a pair of side portions which project downwardly on opposite sides of the press and define said housing parts.

12. A filter press according to claim 8, including control means for first activating said bumping mechanism and thereafter automatically activating said discharge assist means.

13. A filter press according to claim 12, wherein the shift assembly includes a plate shifter mechanism for effecting slidable shifting of the endmost plate of the closed stack along the support rails away from the stack into an open position adjacent the open second head structure, said plate shifter mechanism including a pair of shifter devices disposed adjacent opposite sides of the press and each being engageable with the projecting part on a respective one of the filter plate for effecting shifting thereof, and wherein said control means automatically activates said shifter mechanism to effect shifting of the endmost plate into the open position after deactivation of the discharge assist mechanism.

14. A filter press according to claim 8, wherein said air nozzle assembly includes two generally horizontally elongate rows of nozzles which are disposed transversely of the press and oriented to discharge airstreams in generally opposite directions, one row of nozzles being directed toward and positioned closely adjacent the exposed face of one filter plate defining one side of a gap between two adjacent but spaced filter plates, the other row of nozzles being directed toward and positioned closely adjacent the exposed face of the other filter plate defining the gap, and said drive device effecting movement of the nozzle assembly from a storage position disposed above the filter plates vertically downwardly into the gap to cause pressurized airstreams to first contact the opposed faces of the filter plates toward upper edges thereof with the airstreams moving vertically downwardly along the faces to assist in discharging the filtrate adhered thereto.

15. A filter press according to claim 14, wherein the shift assembly includes a lengthwise-movable housing having a tunnel-like shroud portion which includes an upper wall which extends transversely across the gap at an elevation above the filter plates and a pair of side portions which project downwardly on opposite sides of the gap outwardly of the filter plates for substantially protectively enclosing the gap.

16. A process for discharging filtrate from filter plates of the filter press, comprising the steps of:
 (a) providing a horizontally elongated stack of filter plates positioned in horizontally adjacent, side-by-side contacting relationship;
 (b) moving an endmost plate of said stack horizontally a predetermined distance away from the stack to define a gap between said endmost plate and the next endmost plate of said stack;

(c) vertically bumping solely said next endmost plate to at least partially loosen the filtrate adhered to said plate;

(d) directing pressurized airstreams simultaneously against opposed exposed faces of said endmost and next adjacent plates to assist in removing filtrate adhered to said opposed faces; and (e) sequentially repeating steps (b) through (d) above starting with the next endmost plate.

17. A process for discharging filtrate from filter plates of a filter press, comprising the steps of:

(a) providing a horizontally elongated stack of filter plates positioned in horizontally adjacent, side-by-side contacting relationship;

(b) moving an endmost plate of said stack horizontally a predetermined distance away from the stack to define a gap between said endmost plate and the next endmost plate of said stack;

(c) directing pressurized airstreams simultaneously against opposed exposed faces of said endmost and next endmost plates to assist in removing filtrate adhered to said opposed faces; and (d) sequentially repeating steps (b) through (c) above starting with the next endmost plate.

18. In a filter press including a horizontally elongate frame which extends lengthwise of the press, a first head structure stationarily mounted adjacent one end of said frame, a second head structure mounted on said frame for movement horizontally toward and away from said first head structure for respective closing and opening of said press, a plurality of filter plates movably disposed in generally side-by-side relationship to define a horizontally extending stack between said first and second head structures when said press is closed, each said filter plate mounting thereon a respective filter member which is independent of the filter members mounted on the other filter plates, said filter plates extending transversely relative to the lengthwise direction and being movably supported on said frame for movement lengthwise therealong, and a shift assembly for individually and sequentially shifting said filter plates lengthwise along the frame toward the second head structure when said second head structure is in an open position, the improvement comprising discharge assist means for directing a pressurized stream of air against an exposed face of an endmost plate of said closed stack to assist in dislodging the filtrate adhered to said plate, said discharge assist means including an air nozzle assembly for directing a pressurized airstream at the exposed face of said plate, and a drive device for moving the nozzle, assembly generally parallel across the exposed face.

* * * * *